Dec. 13, 1932.  J. L. FOX  1,890,676
FRUIT TRIMMING AND SLICING APPARATUS
Filed Sept. 3, 1929
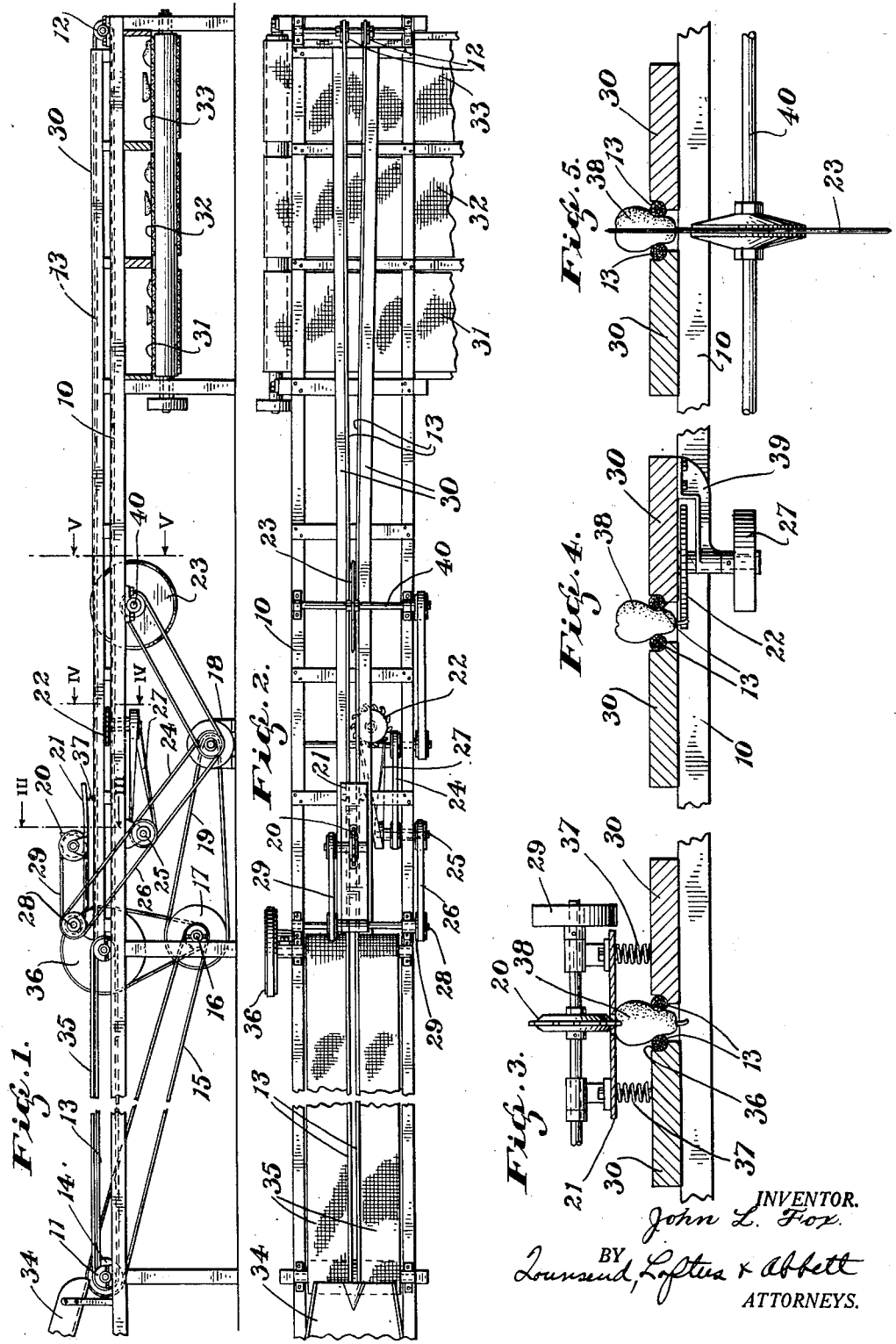

Patented Dec. 13, 1932

1,890,676

UNITED STATES PATENT OFFICE

JOHN L. FOX, OF SONOMA, CALIFORNIA

FRUIT TRIMMING AND SLICING APPARATUS

Application filed September 3, 1929. Serial No. 389,959.

My present invention relates to a new and improved type of apparatus for trimming, stemming and slicing fruits, and more particularly it relates to a machine for trimming, stemming and slicing pears.

An object of my invention is to provide a new and novel machine for the trimming and grading of fruit which is simple, effective, practical and economical in construction and operation.

In the preparation and canning of fruits, particularly where large quantities are handled, it is desirable to speed up the operation and also carry it out in an effective manner to the end that the cost of canning and drying can be reduced to a minimum. In the canning and drying of various fruits, and particularly pears, there is the problem of plucking the calyx from the bottom thereof, the pulling or cutting of the stem, and the halving of the fruit; and it is, therefore, a further object of my invention to provide a new and improved machine in which the above operations may be carried out in connection with fruits in an entirely automatic manner.

Other objects and advantages of my invention will be in part evident and in part pointed out in the description taken in connection with the accompanying drawing, wherein I have shown by way of illustration and not of limitation, a preferred embodiment thereof.

In the drawing—

Fig. 1 is a side elevation of my improved machine showing the general arrangement of the various parts thereof, Fig. 2 is a plan elevation of the apparatus shown in Fig. 1, Fig. 3 is an end elevation, partly in section, taken along line III—III of Fig. 1, Fig. 4 is a view similar to Fig. 3, taken along line IV—IV of Fig. 1, and Fig. 5 is a view similar to Figs. 3 and 4, taken along line V—V of Fig. 1.

In the drawing, 10 designates a suitable framework upon which the various elements of my improved machine are supported. At each end of the frame 10, there is provided a pair of spaced sheaves or pulleys 11 and 12, the pulleys 11 being at the feeding end of the apparatus, and the pulleys 12 at the discharge end thereof. Arranged upon and extending between the sheaves 11 and 12, there is provided a pair of belts 13 of circular cross section. These belts 13 are arranged in a predetermined spaced relation with respect to each other and are supported in this position in a manner as will be pointed out in more detail hereinafter. Arranged between the sheaves 11 and the belts 13, there is provided at the feeding end of the apparatus, a pulley 14 over which a belt 15 passes, the belt 15 passing in turn over a suitable pulley upon a countershaft 16. The countershaft 16 is provided with a driving pulley 17 and is adapted to be driven by a motor 18 through the medium of a belt 19.

At a predetermined point from the feeding end of the conveyor belts 13, there is arranged a floating trimmer or rotary knife 20. This trimmer or knife 20 is, as previously suggested, mounted upon a yielding support 21 so that it may be said to float in a limited degree in a vertical direction so that, as the fruit passes thereunder, the teeth thereof will gouge the fruit to a depth corresponding to the extension of the teeth. Immediately beyond the trimmer 20 with respect to the direction of travel of the belts 13, there is also provided a horizontally disposed rotating stem pulling or cutting device 22. This device 22 is in a great many respects similar to a buzz-saw, except that its teeth are undercut so as to form what might be termed snags or hooks which will function to grab the stem of the fruit and pull it free therefrom, as will be explained in greater detail hereinafter. At a point further along and beyond the stemmer 22, there is also provided a vertically arranged rotary knife 23 which extends upwardly between the conveyor belts 13 so as to halve the fruit as it passes thereover, as will be pointed out in connection with Fig. 5 of the drawing.

The manner of driving the trimmer 20, the stemmer 22, and the halving knife 23, it is thought, will be evident from Fig. 1 of the drawing. It will be sufficient to say that a belt 24 connected with the motor 18 drives a countershaft 25 from which belts 26 and 27 extend respectively to a countershaft 28 and the shaft of the stemmer 22. In connection with the countershaft 28, it should be pointed out that because of the floating nature of the trimming knife 20, it was found necessary to provide an additional belt 29 therefor which extends from a pulley upon the countershaft 28.

By referring now to Fig. 2 of the drawing, it will be seen that the belts 13 are mounted so as to remain substantially parallel to a point beyond the halving knife 23 and to then diverge outwardly so that their spacing is increased as the discharge end of the apparatus is reached. In order to retain the belts 13 in this manner, I have provided supporting members 30 which extend throughout the length of the conveying portion of the belt. These members 30 may be of any suitable form and size. In the drawing they are shown as relatively narrow members having a recess cut into their adjacent edges, into which the conveyor belts 13 are adapted to move. For a better appreciation of this feature, reference should be had to Figs. 3, 4, and 5 of the drawing.

In connection with these latter figures of the drawing, it will be noted, with the belts arranged as above suggested, that particularly in the case of pears it is possible to so place the pear upon the conveyors that it will be carried therealong in a vertical position with its stem projecting downwardly below the conveyor belts. From this it will be seen that the spacing of the belts 13 will determine the particular position of the pear and with the fruit, particularly pears, supported in this manner, it will be seen that at the point where the belts 13 begin to diverge, the fruit will have a tendency to drop down therebetween so that, as provided. adjacent the discharge end of my improved apparatus, the fruits will be dropped from the conveyor belts 13 at predetermined points, depending on the particular size of the fruit being conveyed. At this point, reference is directed to the three conveyor belts 31, 32 and 33 illustrated in Figs. 1 and 2 of the drawing. These conveyor belts 31, 32 and 33 are shown as extending at right angles to the conveyor belts 13 so as to carry the fruit to various other stations, it being understood that each particular belt will, as suggested above, serve to convey away from the apparatus, fruits of different sizes, the smaller fruits engaging the belt 31 and the larger fruits, the belt 33.

Returning now to the feeding end of my improved apparatus, it will be noted that, in addition to a chute 34, by means of which the fruits are introduced to my apparatus, there is provided a pair of slowy moving, relatively wide belts 35. These belts 35 are arranged to be driven from the countershaft 16 by means of a relatively large pulley 36 so that their speed is substantially four times less than that of the conveyor belts 13. These belts 35 provide a slowly moving sorting table adjacent which the attendants stand and pick out the desired fruit and place it in position between the conveyor belts 13 by hand operation. With the belts 13 moving at such a relatively greater speed than the belts 35. it will be seen that the operators will be able to maintain, with the discards, a constant feed of the desirable fruit through the trimming, stemming and slicing devices. As the belts 35 continue to move, they will carry away the green, damaged and otherwise undesirable fruits and discharge them at their ends into suitable containers, it being understood that the perfect or picked fruit continues on with the conveyor belts 13 through the trimming, stemming and slicing zones of the apparatus.

In Fig. 3 of the drawing, the belt spacing members 30 are shown as having a recess 36 formed in their adjacent upper edges in which the belts 13 ride, and the yielding support 21 is shown as being yieldingly supported upon the members 30 adjacent the belts 13 by means of spring supports 37. It will be understood at this point that the pivotal point of the yielding support 21 is about the shaft 28, previously referred to. The springs 37 are so arranged that the floating support 21 will ride at a predetermined distance above the belts 13 so that as the fruit, designated by the numeral 38, passes thereunder, the support will be raised up slightly and thus prevent the trimming knife 20 from cutting too deep a gouge or furrow in the top of the fruit.

In Fig. 4 of the drawing, the members 30 are shown as disposed in substantially the same position as illustrated in Fig. 3, and mounted upon and below one of the members 30, the stemming device 22 is shown, the stemming device 22 being carried by a bracket 39 which forms a journal for the shaft of the stemming member 22. and in Fig. 4 the halving knife 23 is shown as disposed centrally between the belts 13 so that as the fruit 38 passes thereover, it will be cut completely in half, the halving knife in this instance being shown as mounted upon a shaft 40 which extends to suitable bearings upon the frame 10.

In the above description, I have referred to and illustrated pears as the type of fruit being operated upon by my device. In this connection, while it is true that pears, because of their shape, are particularly well suited to this apparatus, it is to be understood that other fruits may be also treated where their particular configuration lends them to this particular type of apparatus.

The operation of my improved apparatus can be best described in connection with Figs. 1 and 2 of the drawing. It will be assumed that a predetermined quantity of fruit has been discharged from the chute 34 upon the slowly moving belts 35 and that a number of operators are standing on each side of the apparatus adjacent these belts. The operators will then pick over the fruit on the slowly moving belts 35 and place the preferred fruits between the conveyor belts 13, as illustrated in Figs. 3, 4 and 5 of the drawing. The fruits will then be conveyed by the belts 13 to the right and under the trimming knife 20, where the blossom will be removed, as illustrated in Fig. 3 of the drawing, the yielding support 21 yielding as the fruit passes thereunder and at the same time supporting the trimming knife 20 so that too deep a cut is not made in the fruit. In the practical operation of my machine, I have found that a trimming knife 20 substantially one-fourth inch wide and adjusted so as to cut into the fruit approximately one-half inch, very effectively removes the blossom from the average Bartlett pear. After passing under the trimming knife 20, the fruit will be conveyed onto the stemming device 22, where, as previously stated, the hooks or snags on the periphery thereof will engage and pull the stem from the fruit. The fruit then, with its blossom removed and the stem pulled, will continue on with the conveyor belts 13 and over the knife 23, where it will be halved, as illustrated in Fig. 5 of the drawing. In connection with the operation of the knife 23, it should be stated that it moves at a relatively high speed and, as a result, cuts freely through the fruit without disturbing the arrangement thereof. The halved fruit will then continue on between the conveyor belts 13 to a point above one or the other of the conveyor belts 31, 32 or 33, depending upon the particular size of the fruit being carried, as will be readily understood.

While I have shown the preferred form of my invention as now known to me, it is to be understood that various changes may be made in its construction without departing from the spirit of the invention as defined in the appended claims.

Having thus described my invention, what I claim and desire to secure by Letters Patent is—

1. In a fruit trimming and slicing apparatus, the combination of a continuous conveyor adapted to convey the fruit in a predetermined position, a rotary cutter mounted above said conveyor adapted to contact with the top of the fruit and remove the blossom thereof as the fruit passes thereunder, a horizontally disposed rotary tooth carrying member disposed below said conveyor adapted to engage and remove the stem of the fruit as it passes thereover, and a vertically extending rotary knife mounted below said conveyor and extending upwardly therethrough adapted to halve the fruit as it passes thereover.

2. In a fruit trimming and slicing apparatus, the combination of a plurality of continuous conveyors one of said conveyors being adapted to convey the fruit in a predetermined position, a rotary cutter mounted above said last mentioned conveyor adapted to contact with the top of the fruit and remove the blossom thereof as the fruit passes thereunder, a horizontally disposed rotary tooth carrying member disposed below said last mentioned conveyor adapted to engage and remove the stem of the fruit as it passes thereover, and a vertically extending rotary knife mounted below said last mentioned conveyor and extending upwardly therethrough adapted to halve the fruit as it passes thereover, said last mentioned conveyor being adapted at the discharge end thereof to discharge the fruit in predetermined zones depending upon the size of the fruit.

3. In a fruit trimming and slicing apparatus, the combination of a continuous conveyor adapted to convey the fruit in a predetermined position, a rotary cutter mounted upon yielding supports above said conveyor and adapted to contact with the top of the fruit and remove the blossom thereof as the fruit passes thereunder, a horizontally disposed rotary tooth carrying member disposed below said conveyor adapted to engage and remove the stem of the fruit as it passes thereover, and a vertically extending rotary knife mounted below said conveyor and extending upwardly therethrough adapted to halve the fruit as it passes thereover.

4. In a fruit trimming and grading apparatus of the character described, the combination of a pair of horizontally disposed belts adapted to support and convey fruit therebetween, a rotary trimming knife disposed above said conveyor belts having teeth projecting therefrom a predetermined distance, and a yielding support for said trimming knife adapted to engage the top of the fruit as it passes thereunder, whereby said trimming knife will only engage the fruit to a predetermined depth.

5. In a fruit trimming and grading apparatus of the character described, the combination of a pair of horizontally disposed belts adapted to support and convey fruit therebetween with its stem projecting downwardly, and a horizontally rotating member having hooks adapted to engage and remove the stem of said fruit as it is conveyed thereover by said conveyor belts.

6. The combination with means for conveying fruit with the stems thereof projecting in a predetermined direction, of a rotating disc associated therewith and having undercut teeth formed in its peripheral edge for engagement with said stems to engage and pull them from the fruit.

JOHN L. FOX.